May 19, 1970     G. R. WINTON     3,512,763
HUMIDIFIER
Filed March 27, 1968     2 Sheets-Sheet 1
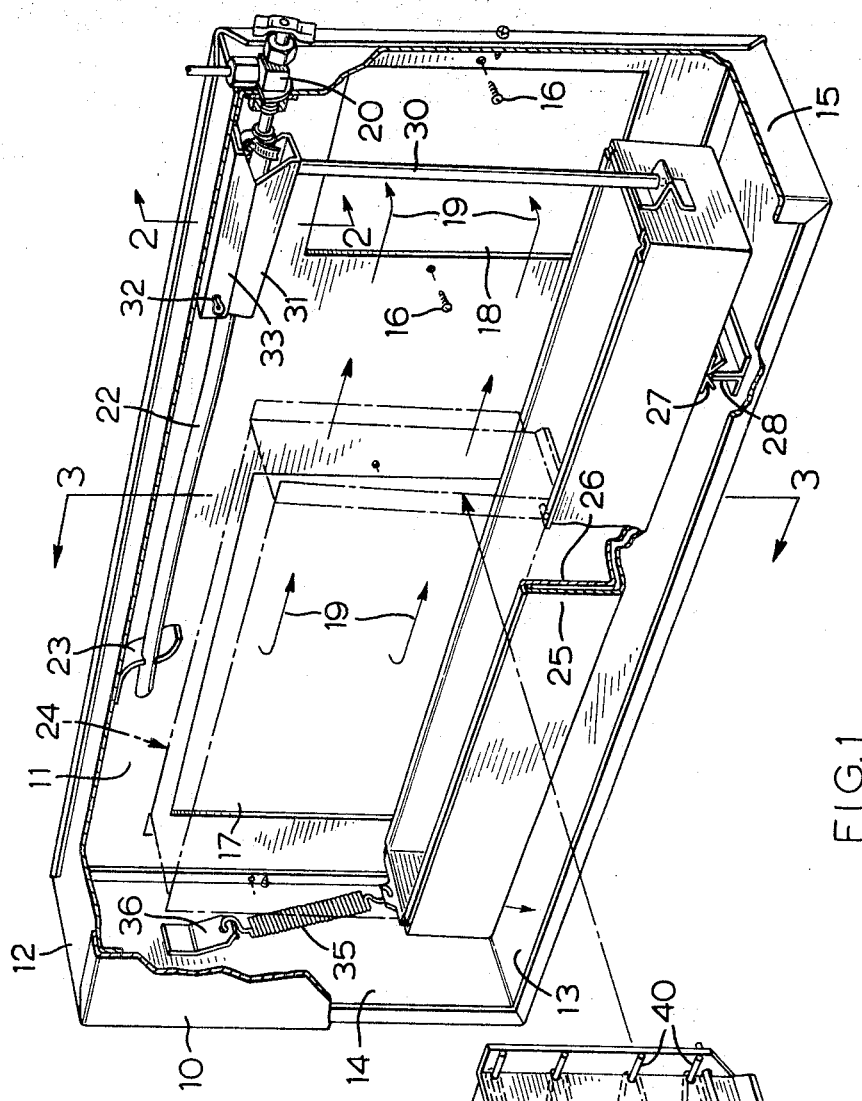
FIG.1
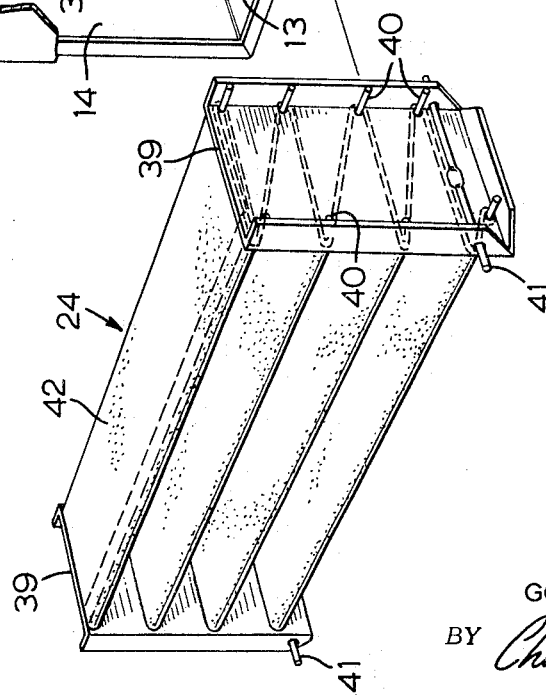
INVENTOR
GORDON R. WINTON
BY *Church & Rogers*
PATENT AGENTS May 19, 1970     G. R. WINTON     3,512,763
HUMIDIFIER
Filed March 27, 1968     2 Sheets—Sheet 2
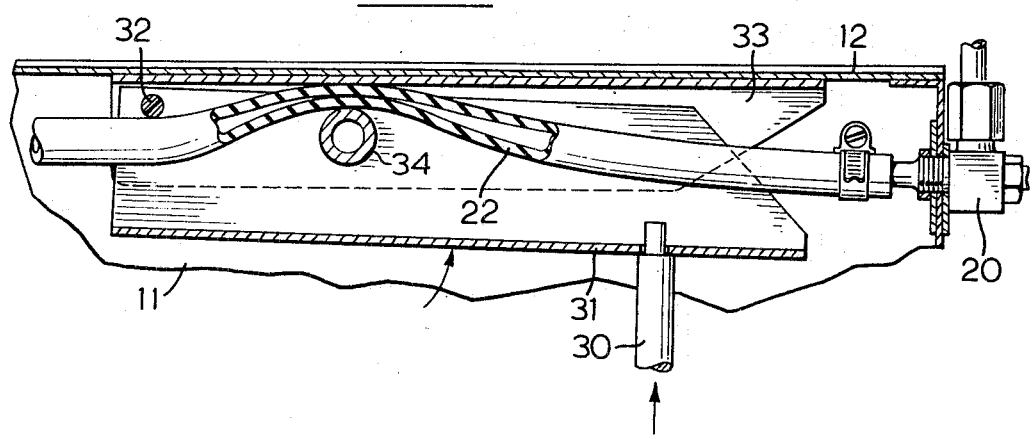
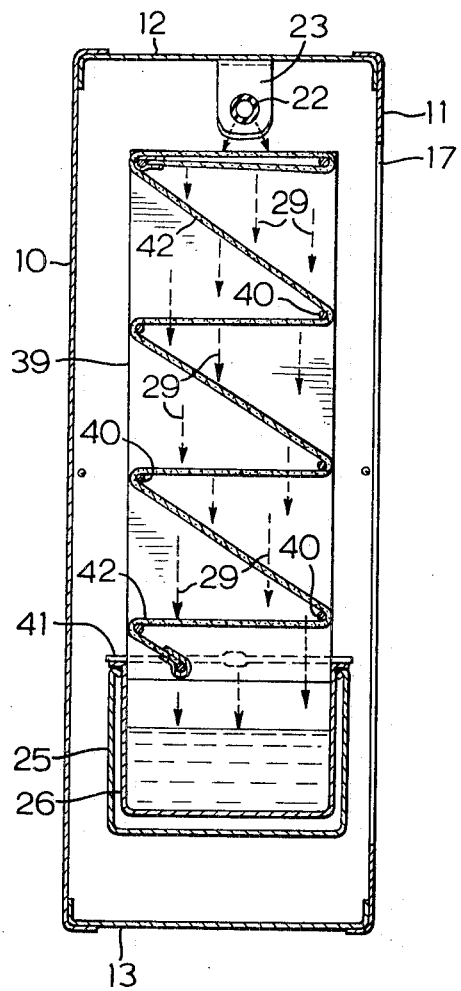
*INVENTOR.*
GORDON R. WINTON
BY *Church & Rogers*
PATENT AGENTS

United States Patent Office 3,512,763
Patented May 19, 1970

3,512,763
HUMIDIFIER
Gordon R. Winton, R.R. 2, Tillsonburg,
Ontario, Canada
Filed Mar. 27, 1968, Ser. No. 716,466
Int. Cl. B01f 3/04
U.S. Cl. 261—141                                17 Claims

ABSTRACT OF THE DISCLOSURE

A humidifier for a forced air furnace has a casing for mounting on the furnace and providing a horizontal air flow path between an air inlet and an air outlet. Water is fed through a valve to the upper part of the casing and flows downward in a water flow path over a humidifier element comprising a taut diaphragm-like zig-zag member, preferably of terry cloth. Water that is not evaporated falls into a pivoted tray on which the humidifier element is mounted, the tray comprising an inner member mounted within and thermally insulated from an outer member. As water accumulates in the tray it pivots and squeezes through a mechanical connection a piece of flexible tube comprising the said valve means to close the valve. The diaphragm-like evaporator member vibrates in the air stream to prevent agglomeration of the residue particles and also is lifted by the air stream to give more positive closing of the valve when the air stream stops.

FIELD OF THE INVENTION

The present invention is concerned with improvements in or relating to humidifiers, and especially to humidifiers for use in association with furnaces of the forced air type employing an air-moving fan.

DESCRIPTION OF THE PRIOR ART

Humidifiers intended to introduce moisture into a space that is heated by a forced air furnace are conveniently directly mounted on the furnace, or the immediately adjacent duct-work, so that moisture is entrained in the air passing through the furnace and carried thereby to the space. In the usual operation of such a furnace/humidifier combination the humidifier usually is arranged to provide an air flow path or passage between the hot and cold air plenums, so that air flows in the said path under the positive pressure differential that exits between the two plenums whenever the furnace is operating.

One difficulty that has been experienced with such humidifiers hitherto, especially those intended for use in association with domestic furnaces, is to obtain sufficient evaporative capacity in a device of compact size, without permitting the entrainment of water in the air stream in droplet form, such droplets being undesirable because of their tendency to deposit readily in the space to which they have been discharged.

Another difficulty is that the evaporation of water obtained from a domestic supply inevitably leaves a solid deposit that may be discharged to the humidified space in the form of an objectionable dusty deposit, and/or may rapidly build up on the evaporator element of the humidifier and drastically reduce or even prevent its effective operation.

SUMMARY OF THE INVENTION

It is an object of the present invention to provide a new humidifier.

It is another object of the present invention to provide a new humidifier especially suited for operation in association with a furnace of the forced-air type.

It is a further object to provide a new humidifier of compact form but of relatively high evaporative capacity.

It is a still further object to provide a new humidifier with which there is a surprising reduction in the rate of build up of said undesirable solid deposit on the humidifier element.

A humidifier in accordance with the present invention is intended for use in association with a force air furnace and comprises a casing, an air inlet to the casing interior and an air outlet therefrom establishing between them an air flow path through the casing interior, means delivering water to the container interior to flow therein in a water flow path, and an evaporator member disposed within the casing interior in both the air and water flow paths.

In accordance with the invention from a first aspect the humidifier is characterised by water delivering means including valve means, the delivering means delivering water to the part of the casing interior that in operative position is the upper part thereof for the delivered water to flow downward in the water flow path, means receiving water not evaporated by the evaporator member, and means connecting the water receiving means and the valve for closing the valve upon receipt of a predetermined quantity of water in the water receiving means.

In accordance with the invention from another aspect the humidifier is characterised by tray means receiving comprising an evaporating diaphragm vibratable by the passage of air in the air flow path.

In accordance with the invention from a further aspect the humidifier is characterised by tray means receiving water not evaporated by the evaporator member, the said tray means comprising an outer tray member and an inner tray member receiving the said water, the said inner member being mounted by and thermally insulated from the outer tray member.

In accordance with the invention from a still further aspect the humidifier is characterised by tray means on which the evaporator member is mounted for receiving water not evaporated by the evaporator member, and mechanical coupling means connecting the tray means and the valve means for closing the latter upon receipt of a predetermined quantity of water in the tray means, wherein the evaporator member has flat surfaces engaged by the said air stream that the evaporator member has lifting force applied thereto by the air stream in the direction to open the said valve means.

DESCRIPTION OF THE DRAWINGS

Embodiments of the invention will now be described, by way of example, with reference to the accompanying dawings, wherein:

FIG. 1 is a perspective view of a particular preferred embodiment with parts of the side walls of the humidifier casing broken away, as necessary, to show the interior thereof, and with the humidifier element shown removed from the casing but with its position therein indicated by an outline in broken lines, FIG. 2 is a view taken on the line 2—2 of FIG. 1, and drawn to a larger scale, to show the operation of an automatically-controlled valve, and FIG. 3 is a plane cross-section taken on the line 3—3 of FIG. 1.

DESCRIPTION OF THE PREFERRED EMBODIMENTS

The embodiment to be described in detail is intended to be used in association with a furnace of conventional type (not illustrated) comprising a main casing of rectangular plan and elevation in which the combustion chamber and heat exchanger are located, a hot-air plenum discharging from the casing, and a cold air plenum discharging into the casing. In operation of the furnace a mixture of returned and outside air passes through the cold air plenum into the heat exchanger which is heated by gases from the combustion chamber, and from thence passes through the hot air plenum to the space to be heated.

The humidifier comprises a rectangular-plan rectangular-elevation casing having removable front and back walls 10 and 11, top and bottom walls 12 and 13, and end walls 14 and 15, the casing being mounted on the outside of and bridging the said furnace plenums, being fastened thereto as by screws 16. Openings 17 and 18 are provided in the back wall 11 and are arranged to register with corresponding openings in the walls of the plenums, so that during operation of the furnace fan there is a flow of heated air through the casing in an air flow path from the opening 17 to the opening 18, as indicated by the arrows 19.

The water to be evaporated into the air stream by the humidifier enters via a control valve 20 mounted in the end wall 15 and passes through a throttlable valve constituted by a length of flexible tubing 22 mounted in a clip 23 attached to the top wall 12. The tube is open at its further end and may also be provided on its underside with a plurality of spaced downwardly facing openings (not illustrated), so that the water is discharged downwards onto an evaporator element 24 to be described in detail below The setting of the valve 20 determines the rate of flow of the water into the humidifier.

The evaporator element is in operative position mounted on an elongated tray comprising an outer member 25 and an inner member 26 mounted within and spaced from the outer member by its engagement with an inwardly extending lip of the latter. The tray extends nearly the full length of the casing and is rockably mounted on a pivot formed by cooperating members 27 and 28 fastened respectively to the underside of the tray and on the bottom casing wall. Water that is not evaporated by the evaporator accumulates in the tray and it will be seen therefore that the water flows in a flow path, indicated in FIG. 3 by the arrows 29, that extends from the tube 22 to the tray 26 and intersects the air flow path; in this particular embodiment such intersection takes place substantially at right angles. The water that accumulates in the tray causes it to rotate anti-clockwise as seen in FIG. 1, and such rotation causes a connecting push rod 30 to move upwards and thereby rotate a channel member 31 anti-clockwise about its pivot 32 with another channel member 33 fastened to the underside of top wall 12. The flexible tube 22 passes through the passage formed by the two channel members, is engaged by a transverse squeezing member 34 (FIG. 2) carried by the movable member 31, and is progressively squeezed by the member as the evaporator becomes saturated and thereafter as the tray fills with water, thereby throttling the flow of water therethrough. With a predetermined quantity of water in the tray the valve formed by the tube 21, channels 31 and 33, and the member 34 is completely closed. The quantity of water in the tray that will cause complete closing of the valve is adjusted to suit the particular installation, and particularly the pressure of the water supplied thereto, for example, by suitable choice of a tension spring 35 connected between the tray and a bracket 36 fastened to the wall 14, and by adjustment of the effective length of the push rod 30, as by means of shim members that are mounted on the ends of reduced diameter. In another arrangement which is not illustrated a rod is vertically movable in the bracket 36 and is connected to the adjacent end of the tray via the tension spring 35. This rod is held in the vertical position to which it is set by a clip, and may be provided with marked graduations corresponding to the water supply pressure, so that it may be set quickly at the required position.

By delivering water to the upper part of the casing the pressure of the water and the effect of gravity are used to obtain its distribution over a large surface area evaporator element, without the need for motor driven elements that are sometimes employed. Moreover, the level of the water in the tray is controlled without the use of a float, which are notoriously unreliable in operation in humidifiers because of their tendency to become coated with the solid deposit. The accumulation of deposit on the element 24 and in the tray will cause the valve to close earlier so that a "fail-safe" type of operation is achieved.

The evaporator member 24 is in this embodiment constituted by two rectangular sheet-metal channel end frames 39 connected by a number of longitudinally-extending wires 40, so that the evaporator is also of generally rectangular form as seen in side elevation. The extent to which the element extends into the tray is determined by two cross-bars 41. The evaporator element proper comprises a sheet 42 of highly moisture-absorbent material, such as terry towelling, which is tightly stretched (at least when wetted) in a zig-zag manner over the wires 40, so that practically all of its surface extends transversely to and intersects the downward flow path of water from the tube, while at the same time it presents practically all of its surface area to the evaporative action of air flowing in the air flow path. The two ends of the sheet may be connected to their respective wires 40 by removable fastening members, so that the element can readily be replaced as required, and its tension can be restored if it becomes slack in operation, but usually it will be preferred simply to replace the element. It will be noted in particular that the uppermost section and the alternate sections of the sheet are generally horizontal, with their planes parallel to the direction of air flow in the air flow path, with the result that the evaporator element is subjected to a lifting action by the air stream. It will be seen that such an action is very advantageous, in that it will assist in opening the valve while the humidifier is in action, while the valve will close more positively when the fan ceases operation.

In some embodiments the lower end of the element 24 may extend into the tray sufficiently for it to dip into any water accumulated therein when the tray has filled to a predetermined level, whereby such water will be absorbed by the element and will move up it by capillary action to be evaporated from the element. In the embodiment particularly illustrated the closed space between the two nested tray members 25 and 26 provides a considerable degree of thermal insulation that keeps the water in the tray sufficiently hot to continue evaporation after the furnace burner has cut out and while the fan is still running, and even after the fan has stopped. The practical effect is that the water in the tray usually completely evaporates without the need for such capillary action. Moreover, when the inner tray becomes excessively corroded and/or excessively coated with residue it can readily be removed and replaced.

It may be noted that the material of the sheet 42 should not only be highly absorbent in respect of the amount of water it is able to absorb, but should also be capable of quickly absorbing the water that is incident thereon, since otherwise there is the possibility that the water may form droplets on the surface of the sheet which become entrained in the air flow, or which may quickly drop to the tray, effectively reducing the evaporative capacity of the device. The terry towelling suggested above is a readily available material that meets these requirements, but other suitable materials can of course be used.

We have found that a humidifier in accordance with our invention in a container of approximately 24 inches length, 5 inches depth and 12 inches height, with an evaporator element comprising a piece of terry towelling 33 inches long and 13 inches wide, in association with a domestic forced air furnace, is able to evaporate up to 18 gallons of water per day, which is ample for most ordinary domestic use.

It is a surprising feature of our invention that, despite the relatively large volume of water that is evaporated in normal use, the build up of solid material on the sheet 42 is much slower than would be expected, and in fact the evaporative efficiency in any case appears to increase with an increase in deposit, perhaps due to a corresponding increase in surface area. It is at present believed that this unexpectedly advantageous effect is due to the sheet being under sufficient tension that it constitutes a porous diaphragm vibrated by the passage of the air over its surface in passing through the air flow path, the resultant vibrations being sufficient to prevent agglomeration of the solid material into larger particles, and also to prevent its adhesion to the sheet, so that the above-mentioned area increase is obtained. This hypothesis of the reason for the unexpectedly advantageous operation is based on observation of the device, and in particular observation of the evaporator element through a window in the front wall 10, when the vibration of the sheet 42 can readily be seen. It has been observed that a substantial deposit of solid material is deposited in the tray in finely divided form, and not the usual solid encrustation that results from the conventional evaporation of water.

What I claim is:

1. A humidifier for use in association with a forced air furnace comprising a casing, an air inlet to the casing interior and an air outlet therefrom establishing between them an air flow path through the casing interior, means delivering water into the casing interior to flow therein in a water flow path, an evaporator member disposed within the casing interior in the air and water flow paths, and tray means receiving water not evaporated by the evaporator member, the said tray means comprising an inner tray member receiving the said water and an outer tray member in which the inner tray member is nested to provide between themselves a closed thermally insulating space.

2. A humidifier as claimed in claim 1, wherein the said tray means is movably mounted by the casing and there are provided a valve in the water delivering means and mechanical coupling means connecting the tray means and the said valve, and wherein the said valve means is a throttlable valve and the said mechanical coupling means are movable by the tray to throttle the valve means upon receipt of water on the evaporator element or in the tray and to close the valve upon the presence of a predetermined quantity of water on the evaporator element and in the tray.

3. A humidifier as claimed in claim 1, wherein in normal operative position of the humidifier the air flow path is generally vertical, and the said evaporator member is a sheet of zig-zag form with the direction of zig-zag generally transverse to the water flow path.

4. A humidifier for use in association with a forced air furnace comprising a casing, an air inlet to the casing interior and an air outlet therefrom establishing between them an air flow path through the casing interior, which in normal operation position of the humidifier is generally horizontal, means including valve means for delivering water to the container interior to flow therein in a water flow path, an evaporator member disposed within the casing interior in the air and water flow paths, tray means movably mounted by the casing and on which the evaporator member is mounted for receiving water not evaporated by the evaporator member, and mechanical coupling means connecting the tray means and the valve means for closing the latter upon movement of the tray means produced by the presence of a predetermined quantity of water on the evaporator element and in the tray means, wherein the evaporator member has surfaces so engaged by the said air stream that the evaporator member has lifting force applied thereto by the air stream in the direction to open the said valve means.

5. A humidifier as claimed in claim 4, wherein the said tray means comprises an inner tray member receiving the said water and an outer tray member in which the inner tray member is nested for the two members to have between themselves a closed thermally-insulating space.

6. A humidifier as claimed in claim 4, wherein the said valve means is a throttleable valve and the said mechanical coupling means are movable by the tray to throttle the valve means upon receipt of water on the evaporator element or in the tray and to close the valve upon the presence of a predetermined quantity of water on the evaporator element and in the tray.

7. A humidifier as claimed in claim 4, wherein the said evaporator member is a sheet of absorbent material maintained under tension at least when wet so as to be vibratable by the passage thereover of the air in the air flow path.

8. A humidifier as claimed in claim 4, wherein in normal operative position of the humidifier the air flow path is generally vertical, and the said evaporator member is a sheet of zig-zag form with the direction of zig-zag generally transverse to the water flow path.

9. A humidifier as claimed in claim 8, wherein the said evaporator member is a sheet of absorbent material maintained under tension at least when wet so as be vibratable by the passage thereover of the air in the air flow path.

10. A humidifier as claimed in claim 4 wherein the said tray means comprises an inner tray member receiving the said water and an outer tray member in which the inner tray member is nested for the two members to have between themselves a closed thermally-insulating space.

11. A humidifier as claimed in claim 10, wherein in normal operative position of the humidifier the air flow path is generally horizontal and the water flow path is generally vertical, and the said evaporator member is a sheet of zig-zag form with the direction of zig-zag generally transverse to the water flow path.

12. A humidifier as claimed in claim 11, wherein the said evaporator member is a sheet of absorbent material maintained under tension at least when wet so as be vibratable by the passage thereover of the air in the air flow paths.

13. A humidifier for use in association with a forced air furnace comprising a casing, an air inlet to the casing interior and an air outlet therefrom establishing between them an air flow path through the casing interior, delivering means including throttleable valve means and for delivering water to the part of the casing interior that in operative position is the upper part thereof for the delivered water to flow downward in a water flow path in the casing interior, an evaporator member disposed within the casing interior in the air and water flow paths and receiving water from the delivering means, a tray pivotally mounted in the lower part of the container interior, the tray having the evaporator member mounted thereon to be movable therewith and receiving water that has been delivered to the evaporator member but has not been evaporated therefrom, the tray being pivoted nearer to one end for rocking movement about the pivot, and mechanical coupling means connecting the tray with the valve means and movable by the tray to throttle the valve means upon receipt of water on the evaporator element or in the tray and to close the valve upon the presence of a predetermined quantity of water on the evaporator element and in the tray.

14. A humidifier as claimed in claim 13, wherein the said throttleable valve means comprises a portion of flexible conduit through which the water passes, and squeezing means operated by the said mechanical coupling means for squeezing the said conduit portion and throttling the flow of water therethrough.

15. A humidifier as claimed in claim 13, wherein the said evaporator member is a sheet of absorbent material maintained under tension at least when wet so as to be vibratable by the passage thereover of the air in the air flow path.

16. A humidifier as claimed in claim 13, wherein in normal operative position of the humidifier the air flow path is generally vertical, and the said evaporator member is a sheet of zig-zag form with the direction of zig-zag generally transverse to the water flow path.

17. A humidifier as claimed in claim 16, wherein the said evaporator member is a sheet of absorbent material maintained under tension at least when wet so as be vibratable by the passage thereover of the air in the air flow path.

References Cited

UNITED STATES PATENTS

| | | | |
|---|---|---|---|
| 1,432,882 | 10/1922 | Lobl | 251—6 |
| 2,112,625 | 3/1938 | Jackson | 251—9 |
| 2,427,714 | 9/1947 | Cooper | 251—9 X |
| 2,875,991 | 3/1959 | Ruegsegger | 261—106 X |
| 3,048,163 | 8/1962 | Powers | 126—113 |
| 3,073,297 | 1/1963 | Martin | 126—113 |
| 3,104,660 | 9/1963 | Martin. | |
| 3,105,860 | 10/1963 | Dunn | 261—103 X |
| 3,157,716 | 11/1964 | Morris | 261—97 X |
| 3,190,624 | 6/1965 | McElreath | 261—92 |
| 3,209,744 | 10/1965 | Ayres et al. | 126—113 |
| 3,211,380 | 10/1965 | Skerritt | 261—106 X |
| 3,215,416 | 11/1965 | Liben | 126—113 X |
| 3,400,919 | 9/1968 | Schall | 261—102 |
| 3,416,564 | 12/1968 | Peters. | |

TIM R. MILES, Primary Examiner

U.S. Cl. X.R.

126—113; 251—9; 261—66, 106